United States Patent
Waddell, Jr. et al.

(10) Patent No.: US 6,703,189 B2
(45) Date of Patent: Mar. 9, 2004

(54) CHEMICAL MODIFICATION OF SUBSTRATES BY PHOTO-ABLATION UNDER DIFFERENT LOCAL ATMOSPHERES AND CHEMICAL ENVIRONMENTS FOR THE FABRICATION OF MICROSTRUCTURES

(75) Inventors: Emanuel A. Waddell, Jr., Gaithersburg, MD (US); Timothy J. Johnson, Gaithersburg, MD (US); Gary W. Kramer, Gaithersburg, MD (US); Laurie E. Locascio, North Potomac, MD (US)

(73) Assignee: National Institute of Standards and Technology, Washington, DC (US)

( * ) Notice: Subject to any disclaimer, the term of this patent is extended or adjusted under 35 U.S.C. 154(b) by 0 days.

(21) Appl. No.: 09/905,567

(22) Filed: Jul. 13, 2001

(65) Prior Publication Data

US 2001/0053495 A1 Dec. 20, 2001

Related U.S. Application Data

(60) Provisional application No. 60/256,654, filed on Dec. 19, 2000.

(51) Int. Cl.[7] ............... G03C 5/00; B23K 26/14
(52) U.S. Cl. ............... 430/322; 430/269; 430/945; 430/394; 219/121.68; 219/121.69
(58) Field of Search ............... 430/322–269, 430/945, 394; 219/121.68–121.69

(56) References Cited

FOREIGN PATENT DOCUMENTS

WO        WO 98/23957       *  6/1998  ......... G01N/33/543

* cited by examiner

Primary Examiner—Mark F. Huff
Assistant Examiner—Daborah Chacko-Davis
(74) Attorney, Agent, or Firm—Butzel Long

(57) ABSTRACT

A method for simultaneously forming microstructures in substrates and altering their chemical character. The method involves exposing a surface portion of a substrate to light source, which is strong enough and of the appropriate wavelength to cause ablation of the substrate. The ablation of the substrate is controlled to form microstructures therein, such as channels. The ablation is conducted under a chemical atmosphere, which causes a change in the chemical functionality of the microstructures. The chemical atmosphere can be a gas, liquid or solid that is provided on the substrate surface. The method can be used to fabricate or modify microfluidic systems.

22 Claims, 4 Drawing Sheets

US 6,703,189 B2

CHEMICAL MODIFICATION OF SUBSTRATES BY PHOTO-ABLATION UNDER DIFFERENT LOCAL ATMOSPHERES AND CHEMICAL ENVIRONMENTS FOR THE FABRICATION OF MICROSTRUCTURES

RELATED APPLICATION

This application is based on U.S. Provisional Patent Application Serial No. 60/256,654 filed Dec. 19, 2000, the complete disclosure of which is expressly incorporated herein by reference.

TECHNICAL FIELD

The present invention relates to the fabrication of microstructures. More particularly, the present invention is directed to a one-step method of forming microstructures in substrates using photo-ablation under a chemical atmosphere that forms the microstructure while altering the chemical functionality of the microstructures.

BACKGROUND ART

A number of competing technologies are currently used for the fabrication of microstructures in polymers including reactive ion etching, plasma etching, x-ray photolithography, chemical etching and template imprinting. However, with each technology there exists an associated disadvantage. In the case of reactive ion and plasma etching, highly specialized equipment, reactive gases, and high vacuums are required. X-ray photolithography (or LIGA) is extremely expensive and requires a synchrotron radiation source, which are in limited number throughout the world.

Currently there are no reports of controlling the chemical functionality of a polymer surface during the fabrication of microstructures. At most, fabrication is completed in one step and functionalization is completed in a subsequent step. In most instances, functionality (or lack thereof) is considered an uncontrollable byproduct of the utilized fabrication process.

DISCLOSURE OF THE INVENTION

According to various features, characteristics and embodiments of the present invention that will become apparent as the description thereof proceeds, the present invention provides a method of forming a microstructure in a substrate, which involves:

exposing a surface portion of the substrate to a light source while providing a chemical atmosphere at the surface portion, so that the light causes ablation of the substrate while the chemical atmosphere effects a change in the chemical functionality of the substrate in the ablated portion thereof.

The present invention further provides a method of fabricating a microfluidic system having fluid flow channels, which involves:

providing a substrate; and exposing a surface portion of the substrate to a light source while providing a chemical atmosphere at the surface portion, so that the light causes ablation of the substrate and formation of microchannels therein while the chemical atmosphere effects a change in the chemical functionality of the substrate in the ablated portion thereof.

BRIEF DESCRIPTION OF DRAWINGS

The present invention will be described with reference to the attached drawings, which are given as non-limiting examples only, in which.

BEST MODE FOR CARRYING OUT THE INVENTION

Figure 1A:
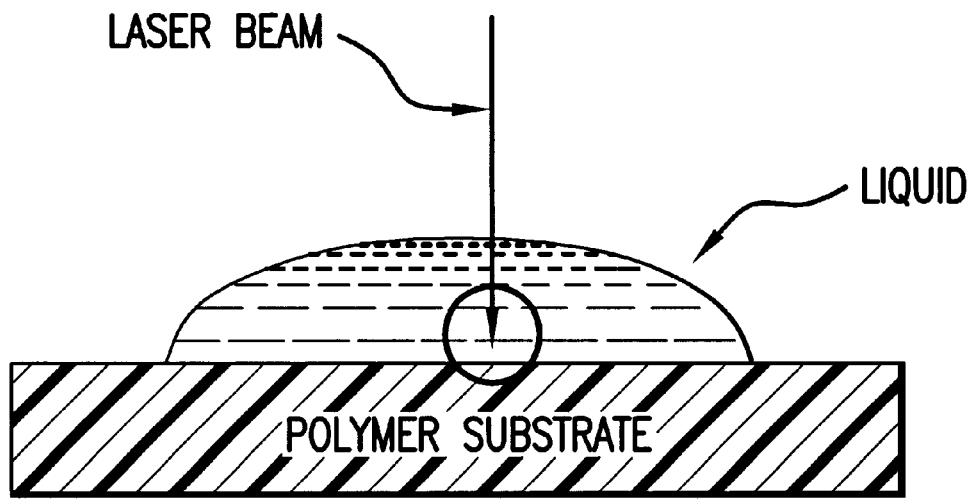
FIGS. 1a and 1b are diagrams, which depict the manner in which photo-ablation is conducted under controlled atmospheres.

The present invention provides a method for fabricating microchannels, microvials, and other microstructures in different substrates which utilizes photo-ablation techniques. Moreover, the present invention involves controlling the atmosphere and chemical environment local to the site of photo-ablation, in order to alter the chemical functionality as well as to control the charge density on the substrate surface. The ability to functionalize a substrate during the fabrication step allows one to construct devices in which microfluidic flow and chemical specificity may be tailored towards specific applications.

The present invention provides a one step photo-ablation process that is performed under different gas and liquid atmospheres to simultaneously pattern microchannels and functionalize the surface in various polymer substrates. During the course of the present invention it has been discovered that by changing the local atmosphere surrounding the ablation site it is possible to alter the chemical nature and surface charge on polymer surfaces during fabrication. This allows two time consuming steps to be integrated into one rapid step.

Potential commercial applications of the techniques of the present invention include the fabrication of micro-total-analytical systems ($\mu$-TAS) which are also referred to as lab-on-a-chip—(LOC) devices. These systems/devices are used for the analysis of chemical compounds and bio-arrays. For example, because of the ability to fabricate microstructures in channels, it is possible to tailor devices that incorporate multiple features (e.g., posts of packed beds). Additionally, the fabrication techniques of the present invention allow one to produce micro-vials that are content specific. Because the process is not limited to a particular class of materials, it can be used in the fabrication of devices in substrates in use today as well as future composites and hybrid materials.

Photo-ablation occurs when a sufficiently energetic beam of photons of sufficient energy and appropriate wavelength is directed onto a surface and consequently chemical bonds are broken resulting in a thermal expansion and pressure ejection of the material.

According to one example of the present invention, a 248-nm KrF pulsed laser was used to ablate polymer substrates. The work surface on which the polymer substrates were placed was a two-dimensional motion-controlled stage that was part of a laser micromachining system (Potomac Systems LMT-4000). The use of a two-dimensional motion-controlled stage allows the formation of linear and/or non-linear channels without moving the laser beam. Alternatively of course, the laser beam could be moved in any desired pattern. In addition to moving the stage, various gases can be directed to flow over the substrate during the ablation process to provide a desired chemical or reactive environment. In some instances, liquids can be placed on the top surface of the substrate and photo-ablation can be achieved by passing the light through the liquid. It is also possible according to the present invention to ablate through a solid on the surface of the substrate to change the functionality of the substrate beneath.

Figure 1B:
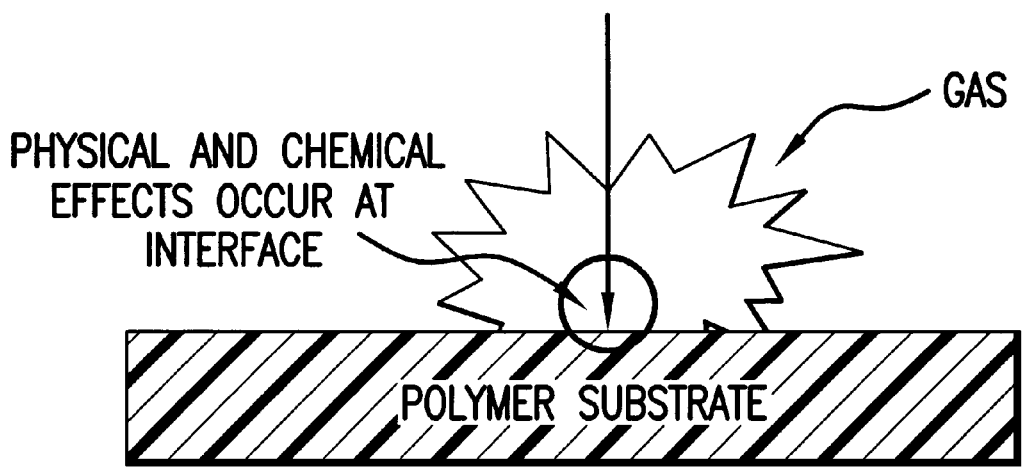

FIGS. 1a and 1b are diagrams that depict the manner in which photo-ablation is conducted under controlled atmospheres. In FIG. 1a the substrate 1 which is targeted for photo-ablation has a liquid 2 on an upper surface thereof. The laser light beam 3 passes through the liquid 2 and ablates the underlying surface of the substrate 1. The liquid can be selected to provide a chemical atmosphere, which reacts with the ablated surface of the substrate 1. FIG. 1b is similar to FIG. 1a except that instead of providing a liquid on the surface of the substrate 1, a gas 4 is directed across the surface of the substrate 1.

When using any of the above processing techniques of the present invention, the dimensions of the microfabricated features produced are limited by the spot size of the beam and the physical characteristics of the substrate, such as its absorption at the photon frequency. The present inventors have discovered that the aspect ratios attainable with the photo-ablation technique are comparable to other techniques such as X-ray micromachining, anisotropic wet etching, and silicon template imprinting. However, the amount of time required to produce a structure according to the present invention is greatly reduced due to the rapidity of the technique.

Figure 2A:
FIGS. 2a–2c are cross-sectional views of channels which are formed by photo-ablation according to the present invention.
Figure 2B:
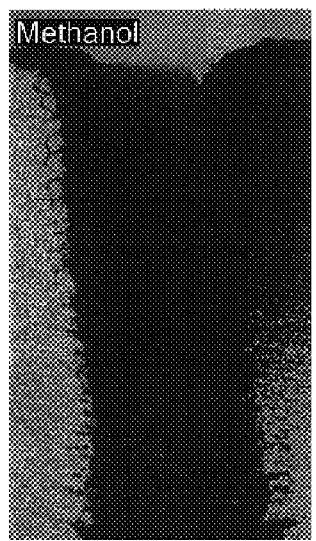
Figure 2C:
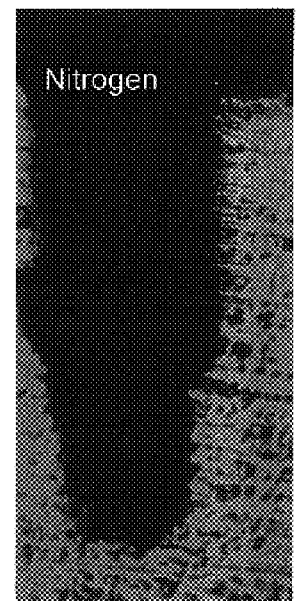

FIGS. 2a–2c are cross-sectional views of channels, which are formed by photo-ablation according to the present invention. The channel produced in FIG. 2a involved photo-ablating a substrate that was covered with water. The channel produced in FIG. 2b involved photo-ablating a substrate that was covered with methanol. The channel produced in FIG. 2c involved photo-ablating a substrate that was blanketed with a stream of nitrogen gas.

Changes in chemical functionality produced by the techniques of the present invention can be assessed using chemical mapping. Chemical mapping is a technique in which group-specific fluorescent probes are used to image functional groups on a polymer surface. During the course of the present invention, ablation effects and chemical functionality were accessed utilizing a modified fluorescein dye to image functional groups on the surface of polymer substrates (e.g., carboxylate groups on PMMA) before and after laser ablation at 248 nm. Additional chemical moieties such as amine or alcohol groups may be probed with differently modified fluorophores. The intensity of the fluorescence correlated to the density of specific functional groups on the surface before and after ablation.

Figure 3A:
FIGS. 3a–3c are fluorescent images of channels that depict the effects of different liquids on surface charge.
Figure 3B:
Figure 3C:
Figure 4A:
FIGS. 4a–4b are fluorescent images of channels that depict the effects of different on surface charge.
Figure 4B:

FIGS. 3a, 3b, and 3c are fluorescent chemical mapping images of a PETG channel ablated under oxygen, nitrogen, and air, respectively. These figures demonstrate changes in chemical functionality produced according to the present invention. FIGS. 4a and 4b are fluorescence images of a polymer (PETG) microchannel ablated under a) methanol and b) water and then chemically mapped as described. These figures demonstrate changes in chemical functionality produced according to the present invention under a liquid atmosphere. FIGS. 3a–3c and 4a and 4b identify the change in carboxyl groups and demonstrate that the process of changing functionality according to the present invention can be verified by chemical mapping.

In addition to chemical mapping, microfluidic channels produced according to the present invention were characterized by their electroosmotic mobility, which is directly related to the surface charge that resides on the channel walls. This characteristic is important in the construction of microfluidic devices because it dictates a channel's ability to move plugs of solution. The electroosmotic mobility was measured by two methods. The first technique utilized was a current monitoring method which measures the amount of time required to displace a solution in a channel with one of another concentration. In the flow imaging method, a caged fluorophore in solution is released by a pulsed laser and imaged by fluorescence microscopy. By monitoring its migration under the influence of an electric field, the electroosmotic mobility of the channel can be ascertained.

Chemical mapping and the measurement of the electroosmotic mobility demonstrate that it is possible to vary the charge density and the distribution of functional groups by controlling the atmosphere and local chemical environment during photo-ablation. Thus, the present invention provides a process by which microfluidic channels and microvials may be constructed in various polymers under different localized chemical atmospheres to create devices that are specific towards different applications.

Using the photo-ablation technique of the present invention, various polymers were ablated under five different local atmospheres. The polymers studied included polycarbonate, polystyrene, poly (ethylene terephthalate glycol), poly (methyl methacrylate), and poly (vinyl chloride). These polymers were ablated under argon gas, nitrogen gas, oxygen gas, liquid methanol, and liquid water. As opposed to other techniques that functionalize an entire surface, the photo-ablation technique allows one to functionalize areas that are defined by the dimension of the photon area imaged on the surface. Consequently, it is possible to place different functional groups adjacent to each other during fabrication B FIGS. 3 and 4 fluorescent images of chemically mapped channels that depict the effects of different atmospheres on surface charge. The substrates depicted in FIGS. 3 and 4 were sonicated in a mild phosphate buffer (pH=7.0) after channel ablation to remove debris, soaked in fluorescein and EDAC for 8 hours, and rinsed in phosphate buffer. The fluorescence in the FIGS. 3 and 4 is indicative of surface bound, labeled carboxylate groups. The substrate in FIG. 3b was photo-ablated under oxygen. The substrate in FIG. 3b was photo-ablated under nitrogen. The substrate in FIG. 3a was photo-ablated under air. The substrate in FIG. 4a was photo-ablated under water. The substrate in FIG. 4b was photo-ablated under methanol.

Figure 5:
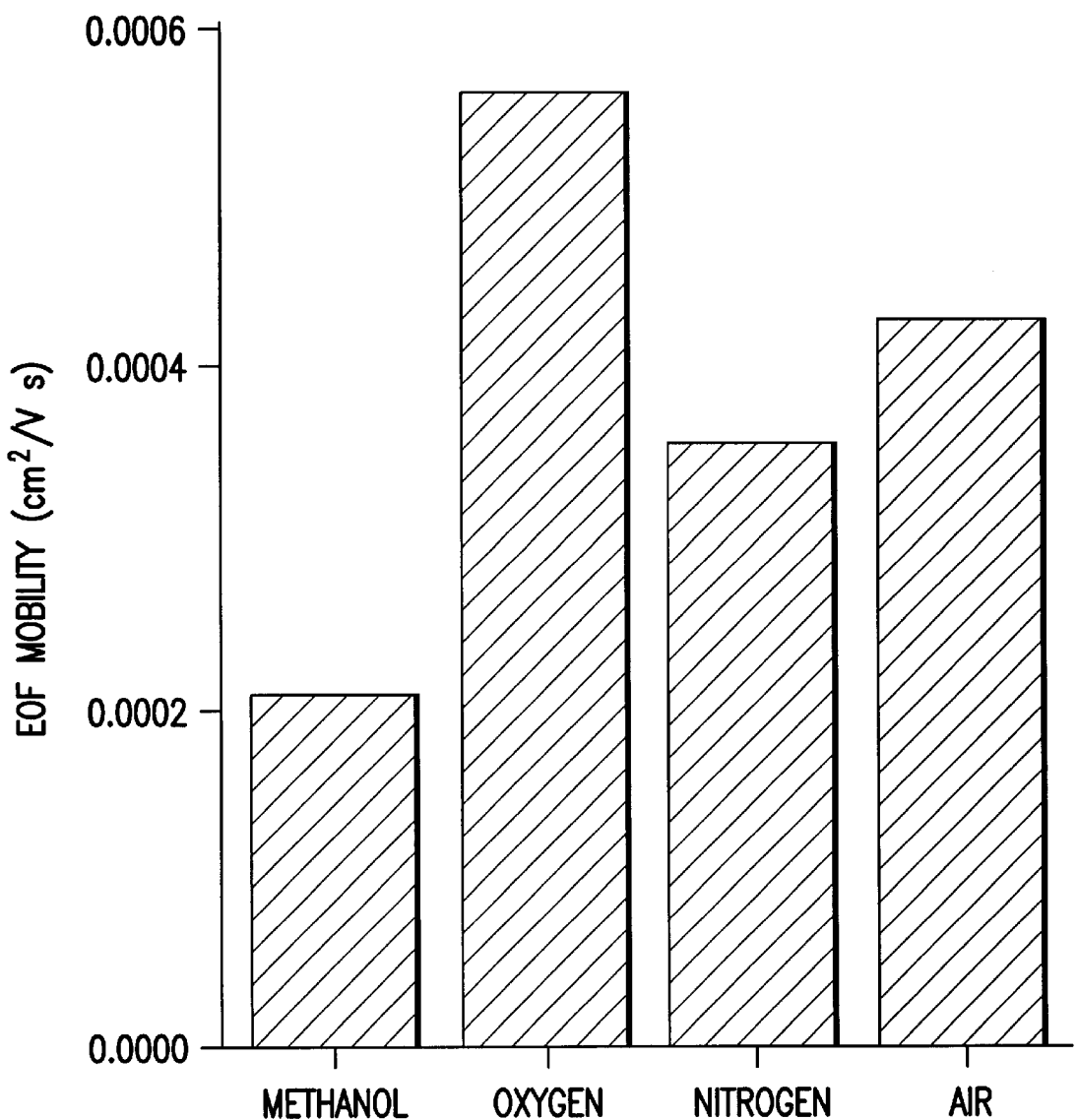
FIG. 5 is a graph that depicts electroosmotic mobility of polycarbonate under different ablation conditions.

FIG. 5 is a graph that depicts electroosmotic mobility of polycarbonate under different ablation conditions. As seen from FIG. 5, microchannels ablated under methanol had the lowest electroosmotic mobility, whereas microchannels ablated under oxygen had the highest electroosmotic mobility. This indicates that the oxygen-ablated channels had a higher surface charge density that those ablated under methanol.

The present invention allows the fabrication and surface modification of polymer microdevices to be integrated into a one-step process. In addition, the localized process allows for different functional groups to be placed in close proximity on the same device. Atmospheres under which photo-ablation takes place may consist of any chemical in a solid, liquid or gas phase that may be placed in contact with the substrate surface. The chemical environment needs to exist only where photo-ablation occurs. Using appropriate wavelengths of light will enable the process to be applied towards fabrication and surface functionalization of any material, including polymeric, glass, silica, ceramics, composites, and hybrid materials.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as set forth in the attached claims.

What is claimed is:

1. A method of forming a microstructure in a substrate which comprises:

providing a substrate having an exposed surface; and exposing a portion of the exposed surface of the substrate to a light source while providing a chemical atmosphere at the portion of to exposed surface, so that to light causes ablation of the exposed surface of the substrate while the chemical atmosphere effects a change in the chemical functionality of the exposed surface of the substrate in the ablated portion thereof.

2. A method of forming a microstructure in a substrate according to claim 1, wherein the substrate is a member selected from the group consisting of polymeric substrates, glass substrates, silica substrates, ceramic substrates and, composites thereof.

3. A method of forming a microstructure in a substrate according to claim 2, wherein the substrate comprises a polymeric substrate.

4. A method of forming a microstructure in a substrate according to claim 3, wherein the substrate is made from a polymeric material selected from the group consisting of polycarbonate, polystyrene, poly (ethylene terephthalate glycol), poly (methyl methacrylate), and poly (vinyl chloride).

5. A method of forming a microstructure in a substrate according to claim 1, wherein the substrate comprises a microfluidic system.

6. A method of forming a microstructure in a substrate according to claim 1 wherein the chemical atmosphere comprises an inert atmosphere.

7. A method of forming a microstructure in a substrate according to claim 1, wherein the atmosphere comprises a reactive atmosphere.

8. A method of forming a microstructure in a substrate according to claim 7, wherein the atmosphere is selected from the group consisting of oxygen, nitrogen, air, methanol, and water.

9. A method of forming a microstructure in a substrate according to claim 1, wherein the ablation of the substrate forms a channel therein.

10. A method of forming a microstructure in a substrate according to claim 9, wherein the channel is linear.

11. A method of forming a microstructure in a substrate according to claim 9, wherein the channel is non-linear.

12. A method of forming a microstructure in a substrate according to claim 1, wherein said chemical atmosphere is one of a solid, a liquid and a gas.

13. A method of forming a microstructure in a substrate according to claim 1, wherein the change in chemical functionality comprises a change in surface charge.

14. A method of fabricating a microfluidic system having fluid flow channels which comprises:

providing a substrate having an exposed surface; and exposing a portion of the exposed surface of the substrate to a light source while providing a chemical atmosphere at the portion of the exposed surface, so that the laser light causes ablation of the exposed surface of to substrate and formation of microchannels therein while the chemical atmosphere effects a change in the chemical functionality of the exposed surface of the substrate in to ablated portion thereof.

15. A method of fabricating a microfluidic system having fluid flow channels according to claim 14, wherein the substrate is a member selected from the group consisting of polymeric substrates, glass substrates, silica substrates, ceramic substrates, and composites thereof.

16. A method of fabricating a microfluidic system having fluid flow channels according to claim 15, wherein the substrate comprises a polymeric substrate.

17. A method of fabricating a microfluidic system having fluid flow channels according to claim 14, wherein the substrate is made from a polymeric material selected from the group consisting of polycarbonate, polystyrene, poly (ethylene terephthalate glycol), poly (methyl methacrylate), and poly (vinyl chloride).

18. A method of fabricating a microfluidic system having fluid flow channels according to claim 14, wherein said chemical atmosphere is one of a solid, a liquid and a gas.

19. A method of fabricating a microfluidic system having fluid flow channels according to claim 14, wherein the chemical atmosphere comprises an inert atmosphere.

20. A method of fabricating a microfluidic system having fluid flow channels according to claim 14, wherein the chemical atmosphere comprises a reactive atmosphere.

21. A method of fabricating a microfluidic system having fluid flow channels according to claim 14, wherein the microchannels comprise at least one of linear and non-linear channels.

22. A method of fabricating a microfluidic system having fluid flow channels according to claim 14, wherein the change in chemical functionality comprises a change in surface charge.

* * * * *